United States Patent [19]

Wright

[11] 3,745,453

[45] July 10, 1973

[54] INSTRUMENTS FOR CHECKING THE OPERATION OF EARTH LEAKAGE CIRCUIT BREAKERS

[75] Inventor: Maurice James Wright, Quinton, England

[73] Assignee: Joseph Lucas (Industries) Limited, Birmingham, England

[22] Filed: Apr. 27, 1971

[21] Appl. No.: 137,771

[30] Foreign Application Priority Data
May 2, 1970 Great Britain .................. 21,201/70

[52] U.S. Cl. ............ 324/51, 317/18 D, 324/28 CB, 340/256
[51] Int. Cl. ........................................... G01r 31/02
[58] Field of Search ...................... 324/51, 54, 28 R, 324/28 CB; 317/18 R, 18 D; 340/255, 256, 250

[56] References Cited
UNITED STATES PATENTS

| | | | |
|---|---|---|---|
| 3,281,677 | 10/1966 | Baggott | 324/51 X |
| 3,287,636 | 11/1966 | Gagniere | 324/54 |
| 3,320,480 | 5/1967 | Failor | 324/51 X |
| 3,344,313 | 9/1967 | Kraus | 324/51 X |
| 3,515,942 | 6/1970 | Gordon | 317/18 D |

FOREIGN PATENTS OR APPLICATIONS

| | | | |
|---|---|---|---|
| 1,100,171 | 1/1968 | Great Britain | 324/51 |

*Primary Examiner*—Gerard H. Strecker
*Attorney*—Holman & Stern

[57] ABSTRACT

An instrument for checking the operation of earth leakage circuit breakers comprises terminals for connection to an a.c. circuit, a first capacitor which when the instrument is connected to the circuit is charged through a rectifier to provide a power source and a test switch which is operable to present to the a.c. circuit a predetermined live to earth leakage current. A second capacitor which is charged when the test switch is operated, charging of the second capacitor terminating when the circuit breaker being tested operates, provides an input to an amplifier powered by the first capacitor, and the amplifier operates warning means for giving the required indication.

7 Claims, 2 Drawing Figures

INVENTOR
Maurice James Wright

ATTORNEYS

INSTRUMENTS FOR CHECKING THE OPERATION OF EARTH LEAKAGE CIRCUIT BREAKERS

This invention relates to an instrument for checking the operation of earth leakage circuit breakers. An earth leakage circuit breaker is a device which is incorporated in an a.c. circuit and detects a predetermined leakage current between the live and earth lines in the circuit, and then automatically breaks the circuit.

An instrument in accordance with the invention comprises in combination terminals for connection in the a.c. circuit, a first capacitor which when the instrument is connected to the circuit is charged through a rectifier to provide a power source, a test switch which is operable to present to the a.c. circuit a predetermined live to earth leakage current, and a second capacitor which is charged when the test switch is operated, charging of the second capacitor terminating when the circuit breaker being tested operates, and the second capacitor providing an input to an amplifier powered by the first capacitor, the amplifier operating warning means for indicating whether the circuit breaker is satisfactory.

Figure 1:
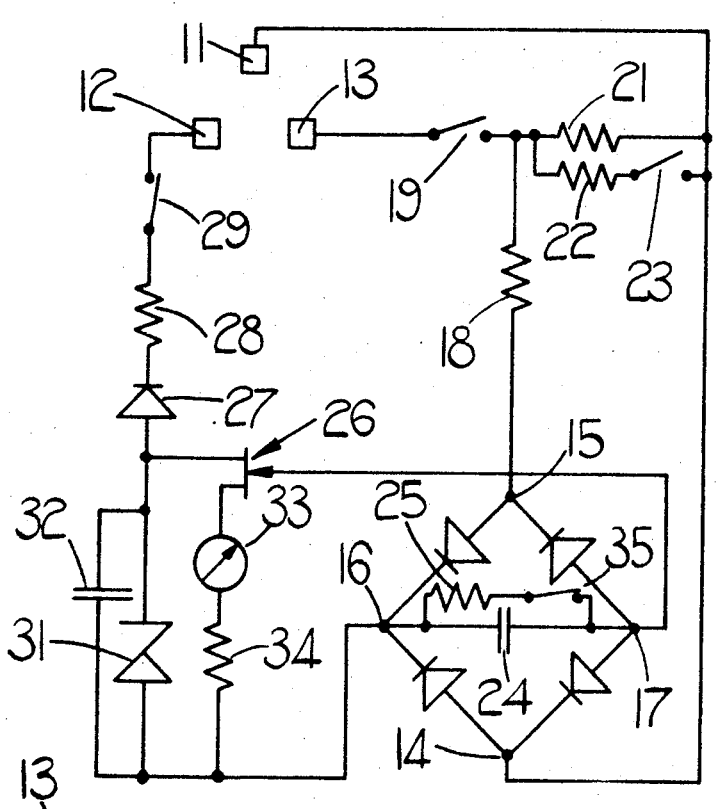
FIG. 1 is a circuit diagram illustrating one example of the invention.

Referring to the drawing, the instrument includes live, neutral and earth terminals 11, 12, 13 which in use are connected to the live, neutral and earth leads of an a.c. system incorporating a circuit breaker the operation of which is to be tested. The terminal 11 is connected to one input terminal 14 of a full wave rectifier which includes a further input terminal 15, and output terminals 16 and 17 and four diodes connected in the usual manner. The terminal 15 is connected to the terminal 13 through a resistor 18 in series with normally open contacts 19, and the junction of the resistor 18 and contact 19 is connected to the terminal 14 through parallel paths one of which contains a resistor 21, and the other of which contains a resistor 22 and a test switch 23 in series.

The terminals 16 and 17 are interconnected through a capacitor 24 bridged by a resistor 25 in series with normally closed contacts 35, and the terminal 17 is further connected to the gate of a field effect transistor 26, the drain of which is connected to the terminal 12 through a series circuit incorporating a diode 27, a resistor 28 and normally closed contacts 29. The drain is further connected to the terminal 16 through a Zener diode 31 in parallel with a capacitor 32, and the source of the transistor 26 is connected to the terminal 16 through a meter 33 and a resistor 34 in series. The contacts 19, 29 and 35 are ganged to form a single biased toggle switch.

When it is desired to test a circuit breaker, the instrument is plugged into the outlet socket of the breaker-protected a.c. mains, the operation being as follows. As soon as the instrument is connected to the outlet socket, the capacitor 32 is charged by way of the diode 27 to a voltage determined by the Zener diode 31. The capacitor 32 then provides a power source for the instrument. In order to test the effectiveness of the circuit breaker, it is necessary to simulate a leakage current between the terminals 11 and 13, and this is accomplished by operating the biased toggle switch, thereby opening contacts 29 and 35 and closing contacts 19 resulting in a flow of current at a magnitude determined by the resistor 21. At the same time, the capacitor 24 starts to charge, and goes on charging until the circuit breaker opens, at which point no further current flows to the capacitor 24. The capacitor 24 determines the gate voltage of the transistor 26, and the capacitor 32 provides a power source for the transistor 26, so that the meter 33 gives an indication of the voltage developed across the capacitor 24, which in turn is dependent on the length of time for which the leakage current exits before the circuit breaker opens. The meter 33 is calibrated in any convenient manner so that it can readily be determined whether the circuit breaker is satisfactory.

Closing switch 23 connects the resistor 22 in parallel with resistor 21 thereby effecting an increased leakage current when the instrument is operated. It will be appreciated that switch 23 could be a multiway switch allowing a variety of currents to be chosen in accordance with the contact breaker specification.

Figure 2:
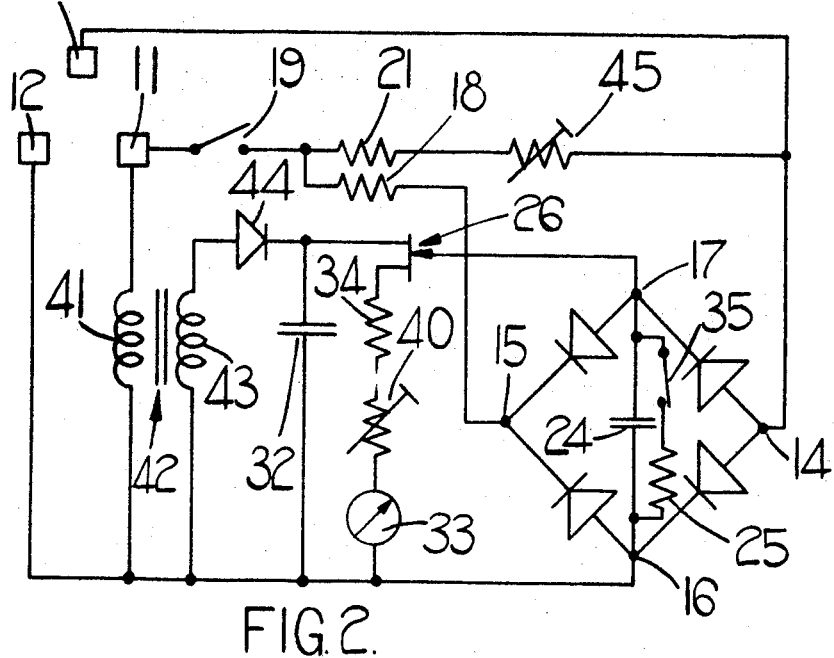
FIG. 2 shows a modified form of the invention.

Referring now to the example shown in FIG. 2, the operation is basically similar, although the components are re-arranged and modified. Components in FIG. 2 which serve the same function as those in FIG. 1 have been identified with the same reference numerals.

It will be seen that in FIG. 2 the network connected to the terminal 12 is simplified and consists of the primary winding 41 of a transformer 42, the winding 41 having one end connected to the terminal 12 and the other end connected to the terminal 11. The secondary winding 43 of the transformer is bridged by a circuit including a diode 44 and the capacitor 32, and the junction of the diode 44 and capacitor 32 provides the input to the drain of the transistor 26. The source circuit of the transistor 26 includes the resistor 34, a further pre-set resistor 40 and the meter 33, and the gate of the transistor 26 is connected to the terminal 17 as before. The bridge network is exactly the same as in FIG. 1, but with the terminal 13 connected to the terminal 14. Also, the connection from the terminal 11 is now by way of the switch 19, the resistor 21 and a further variable resistor 45, the resistor 22 and switch 23 being omitted.

In operation, the only point of difference is that the capacitor 32 is now charged through the transformer 42, instead of directly by way of the diode 27 as in FIG. 1. The voltage to which the capacitor 32 is charged is now determined by the characteristics of the transformer, instead of the Zener diode 32 in FIG. 1. In order to simulate the leakage current, the biased toggle switch is again operated, but the contacts 29 are now not necessary, and the toggle switch merely closes the contact 19 and opens the contact 35, whereupon the reading is obtained in exactly the same way as in FIG. 1.

The purpose of the resistor 45 is to allow the leakage current to be varied, and in many cases it is simpler to provide a variable resistor 45 than to switch different values of resistor into the circuit as in FIG. 1. The resistor 45 is pre-set, and is used to compensate for tolerances on the components employed in the circuit, particularly the transistor 26 and the capacitor 32.

In both circuits it will be appreciated that the deflection of the meter 33 is read after the disconnection of the a.c. mains by the circuit breaker. Thus the capacitor 24 acts as a memory as well as a time integrating device. Also the value of capacitor 32 and the operating current of transistor 26 are so proportioned that, following disconnection of the d.c. it takes several seconds before the decay of voltage on capacitor 32 affects the meter reading.

It will be appreciated that the meter could be replaced by other warning means, for example a lamp or buzzer.

I claim:

1. An instrument for checking the operation of an earth leakage circuit breaker, said earth leakage circuit breaker being incorporated in a three wire a.c. circuit presenting live, neutral, and earth output lines for connection of loads thereto and detecting a predetermined leakage current between the live and earth lines in said a.c. circuit, and then automatically breaking the circuit when a predetermined leakage current exists, said checking instrument comprising in combination a terminal for connection to each line in said a.c. circuit such that the instrument constitutes a load, a first capacitor, means including a rectifier coupling said first capacitor across said terminals for connection to the live and neutral lines, said first capacitor thereby being charged through said rectifier when the instrument is connected to said a.c. circuit to provide a power source, a test switch connected in series with an impedance across said terminals for connection to the live and earth lines, said test switch when closed providing a shunt circuit path between said live and earth terminals simulating a predetermined live line to earth line leakage current, a second capacitor connected in circuit with said test switch between said terminals for connection to the live and neutral lines of the a.c. circuit, such that said second capacitor charges only when said test switch is closed, whereby said earth leakage circuit breaker being tested serves upon proper operation thereof to break the a.c. circuit whereupon said second capacitor ceases to charge, said first capacitor thereafter continuing to provide a power source for the instrument after disconnection of the a c circuit, said instrument further including an amplifier powered by said first capacitor, and means coupling said second capacitor to the input of said amplifier, said amplifier operating warning means for indicating the state of charge of said second capacitor, which is a measure of satisfactory operation of the circuit breaker being tested.

2. An instrument as claimed in claim 1 in which the warning means is a meter.

3. An instrument as claimed in claim 1 in which the first capacitor is charged through said rectifier from the secondary winding of a transformer having its primary winding connected in the a.c. circuit.

4. An instrument as claimed in claim 1 including means for varying the leakage current.

5. An instrument as claimed in claim 2 including a resistor in series with the meter, said resistor being variable so that the circuit can be calibrated to allow for tolerance in the components.

6. An instrument as claimed in claim 1 in which said second capacitor is charged through a second rectifier by the a.c. supply in use.

7. An instrument as claimed in claim 6 in which the second rectifier is a full wave rectifier having its input terminals connected across a resistor which determines said live to earth leakage current, and the second capacitor connected across its output terminals.

* * * * *